(12) United States Patent
Kelly et al.

(10) Patent No.: US 6,394,724 B1
(45) Date of Patent: May 28, 2002

(54) SNAP-IN PANEL FASTENER

(75) Inventors: Patrick Kelly, Wyndmoor; Peter A. Vogel, Dublin; Craig G. Link, Perkasie, all of PA (US)

(73) Assignee: PEM Management, Inc.

( * ) Notice: Subject to any disclaimer, the term of this patent is extended or adjusted under 35 U.S.C. 154(b) by 0 days.

(21) Appl. No.: 09/739,689

(22) Filed: Dec. 20, 2000

Related U.S. Application Data
(60) Provisional application No. 60/177,193, filed on Jan. 21, 2000.

(51) Int. Cl.[7] ................... F16B 21/118; F16B 39/00
(52) U.S. Cl. .................. 411/353; 411/107; 411/509; 411/970; 411/999
(58) Field of Search ................. 411/107, 352, 411/353, 508, 509, 970, 999

(56) References Cited

U.S. PATENT DOCUMENTS

| | | | | |
|---|---|---|---|---|
| 4,952,107 A | * | 8/1990 | Dupree | 411/107 X |
| 5,017,068 A | | 5/1991 | Cooksey | 411/373 |
| 5,020,951 A | * | 6/1991 | Smith | 411/107 |
| 5,094,579 A | * | 3/1992 | Johnson | 411/107 |
| 5,462,395 A | * | 10/1995 | Damm et al. | 411/353 X |
| 5,544,992 A | | 8/1996 | Ciobanu | 411/353 |
| 5,851,095 A | | 12/1998 | Ellis et al. | 411/353 |
| 6,079,923 A | * | 6/2000 | Ross et al. | 411/353 |

* cited by examiner

*Primary Examiner*—Neill Wilson
(74) *Attorney, Agent, or Firm*—Gregory J. Gore

(57) ABSTRACT

A panel fastener includes a metallic screw insert with an overmolded plastic cap. The screw insert is preferably manufactured by means of cold forming process which allows fabrication of the internal drive recesses and dog point ends for easy location of the mating threads while providing increased thread strength. The plastic cap is in the form of a knob which has large flutes on its outer diameter for ergonomic finger operation. In addition the knob may have a slot molded into its top to allow screwdriver or coin operation. The metallic insert may also be accessed by a drive through a central cavity in the knob. Assembly of the screw to the ferrule is achieved by passing the screw threads through the ferrule body which includes an internal annular retaining ring. The ring is very narrow and dimensioned to allow the screw to be easily pressed through the annular opening since the ring elastically expands as the thread portion of the screw passes through it. The screw is thus captivated in the ferrule however may be removed by applying a light axial force in a direction away from the panel and simultaneously applying a counterclockwise rotation to the screw head to "unthread" the screw through the annular retaining ring. The ferrule includes a plurality of resilient fingers on its leading edge which provide low installation force snap-in panel attachment.

9 Claims, 4 Drawing Sheets

SNAP-IN PANEL FASTENER

This application is related to Provisional Patent Application Serial No. 60/177,193 entitled 'Snap-In Panel Fastener,' filed Jan. 21, 2000.

FIELD OF THE INVENTION

The present invention relates to captive panel fasteners of the type having a retractable screw. The screw is captive and extendible within a ferrule which snaps into one of two panels joined by the fastener.

BACKGROUND OF THE INVENTION AND PRIOR ART

Snap-in panel fasteners are well known in the art and typically include a screw which is held captive but is free to move axially within a ferrule which is secured to a first panel. The ferrule is affixed to the panel by inserting its shank portion into a punched or drilled hole whereupon resilient metallic fingers collapse until they are free to expand on the reverse side of the panel. The resilient fingers have a groove which snaps into the panel mounting hole as the fingers return to their normal state. The ferrule and thus the entire assembly is held captive in the panel.

The prior art fasteners of the above-described type are typically high in cost as both the screw and ferrule are machined or formed from a metallic bar or wire at a fairly slow production rate. Also, they are available in limited configurations due to the manufacturing processes, and only in a very limited range of colors. Most importantly, prior art snap-in panel fasteners require a secondary operation, and in some cases, the introduction of a third washer-like member in order to captivate the screw in the ferrule. In some designs, should screw threads become damaged, screw removal and replacement is impossible due to the method by which the screw is captivated in the ferrule. Thus, repairs can only be achieved by replacing the entire assembly, increasing repair difficulty and warranty costs.

The users of panel fasteners are also moving away from the traditional configuration of such hardware, and lower cost aesthetic units with color coded, and color-matched screws and ferrules are needed. Screw heads also must meet ergonomic and aesthetic needs and such heads must easily be modified for different drive configurations. In addition, a simpler method of captivating the screw in the ferrule is also needed. Therefore, there is a need in the art for a new type of snap-in panel fastener which meets these requirements.

SUMMARY OF THE INVENTION

The present invention meets the needs in the art described above and provides a marked improvement over the prior art by replacing the traditional metallic screw and ferrule with a hybrid screw/plastic cap and a plastic ferrule, thus providing the user with unique advantages.

The screw portion is comprised of a metallic screw insert with an overmolded plastic cap. The screw insert is preferably manufactured by means of a cold forming process which allows fabrication of internal drive recesses, and dog point ends for easy location of mating threads while providing increasing thread strength when compared to conventional cut threads. The screw insert is fabricated with a non-round head which permits the molded plastic knob to transmit tightening torque to the screw insert as well as resistance to axial loads between the knob and the screw inert. An unthreaded neck is sized to allow radial float between the screw axis and the ferrule axis. The knob has large flutes on its outer diameter for ergonomic finger operation. In addition, the knob may have a slot molded in its top to allow screwdriver or coin operation. The knob also has a central cavity that allows a drive tool direct access to the internal drive recess of the metallic screw inert.

In production, screw inserts are loaded into suitable mold cavities in an injection molding press and as molten plastic is injected into the mold cavities, a cap or knob is formed directly on the screw inert. Both the screw knob and the ferrule are molded from an engineered plastic such acetyl copolymer, one example of which is sold under the brand name "Celcon"®. Other engineered plastics may be used to achieve required flammability ratings. Metallic ferrules are machined from bar stock on a screw machine at a typical rate of 250 pieces per hour. Molten plastic is then injected into suitable mold cavities to produce the required shape. Production rates for injection molded ferrules is typically 5400 pieces per hour using 32-cavity tooling, resulting in substantial cos savings. Additional mold cavities can increase this production rate even higher.

Assembly of the screw to the ferrule is achieved by merely pressing the screw threads through the ferrule body. An integral internal annular retaining ring in the ferrule is dimensioned to be less than the major diameter of the screw thread and equal to the minor diameter. The ring is very narrow such that it allows the screw to be easily pressed through the annular opening, which elastically expands as the threaded portion of the screw passes through it, but then contracts to its normal diameter once the threaded portion has passed. The screw is thus captivated in the ferrule, resisting unintentional disengagement due to vibration or axial loading. However, a damaged or defective screw may still be removed from the ferrule, by applying a light axial force to the screw in a direction away from the panel, and simultaneously applying a counter-clockwise rotation to the screw head, which "unthreads" the screw through the annular opening without damaging the annular ring. A new screw may then be reinserted in a reverse fashion, by applying an axial force toward the panel and applying a clockwise rotation.

The assembly, including the screw and the ferrule, is snapped into the first panel by means of pressing the shank of the ferrule into its properly sized mounting hole. Resilient fingers on the leading edge of the ferrule have lead-in ramps which permit low installation force in order to minimize wear on ferrule surfaces and eliminate marring of finished, painted panels. The panel mounting hole is sized to interlock with the ferrule undercut allowing the fingers to return to an unstressed condition. The flat upper face of the fingers provides high pullout resistance from the panel.

Therefore, the main object of the invention is to provide the advantages described above. Other objects and advantages will be apparent from the following drawings and the description of the preferred embodiment.

DESCRIPTION OF THE PREFERRED EMBODIMENT

Figure 1:
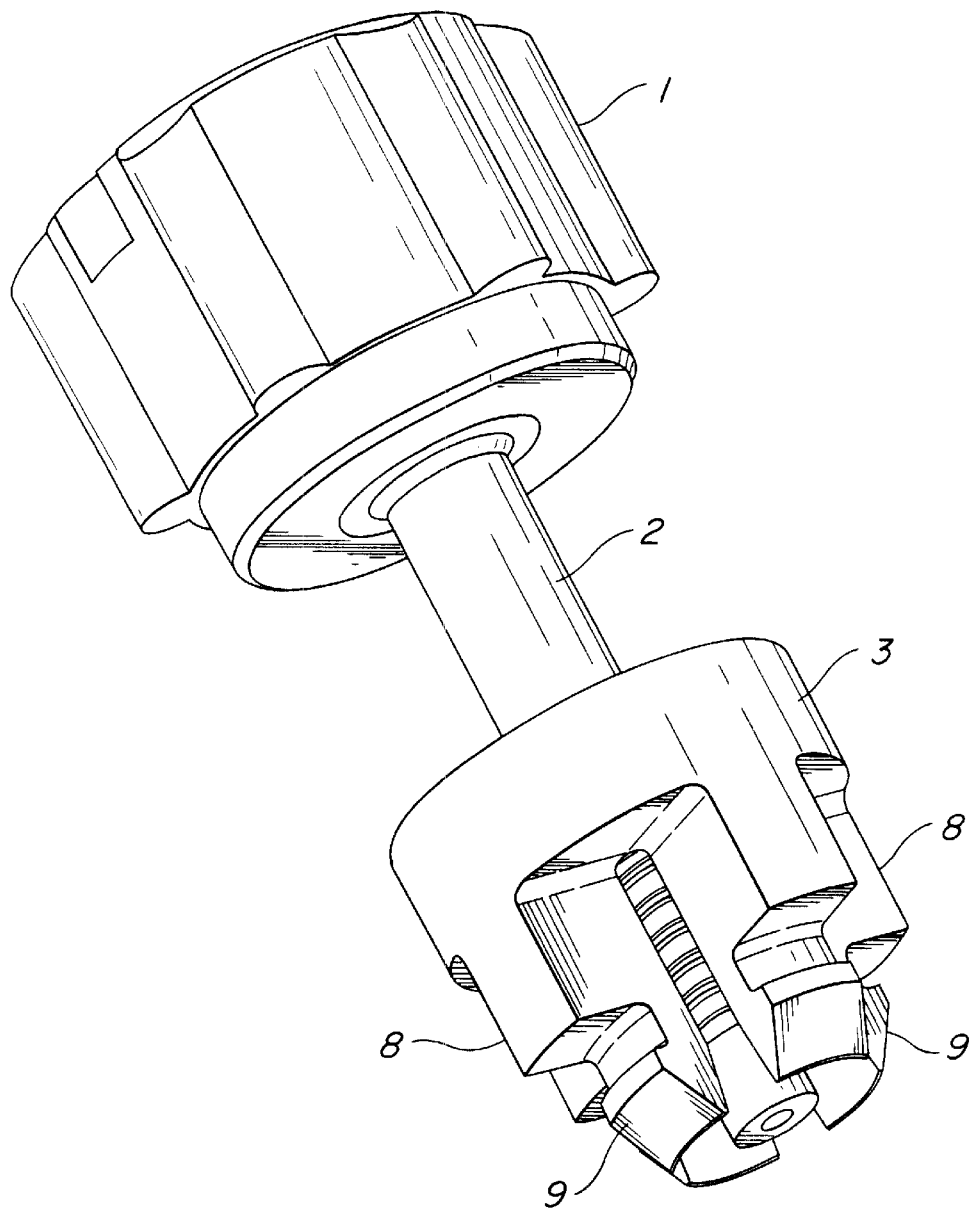
FIG. 1 is a bottom front isometric view of the present fastener.

FIG. 1, is a front sectioned view of the panel fastener of the present invention in the closed position. Knob 1 is affixed to the head of screw 2 which moves axially within ferrule 3. In this view the structure of the resilient fingers 8 are shown in detail. Each finger includes a lead-in tapered angle 9 and a panel gripping undercut 10. These structures provide ease of insertion and solid attachment of the ferrule 2 to the panel by snap fit achieved by the resilience of the fingers.

Figure 2:
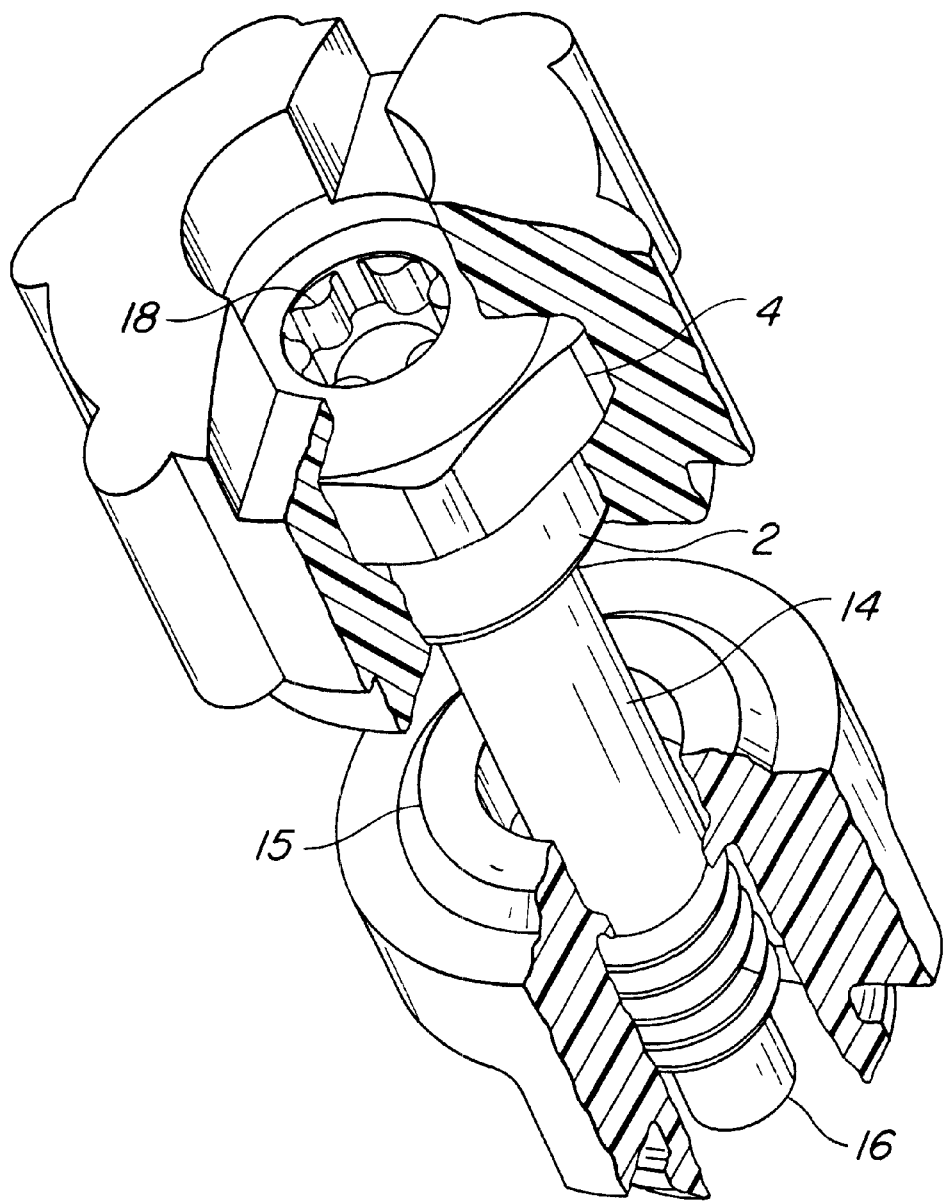
FIG. 2 is a top front isometric view of the panel fastener with the cap and component elements sectioned.

FIG. 2, is a front isometric sectioned view in the retracted position, showing raised bearing area 15, recessed driver 18, dog point 16, anti-rotational feature 4, and unthreaded neck 14.

Figure 3:
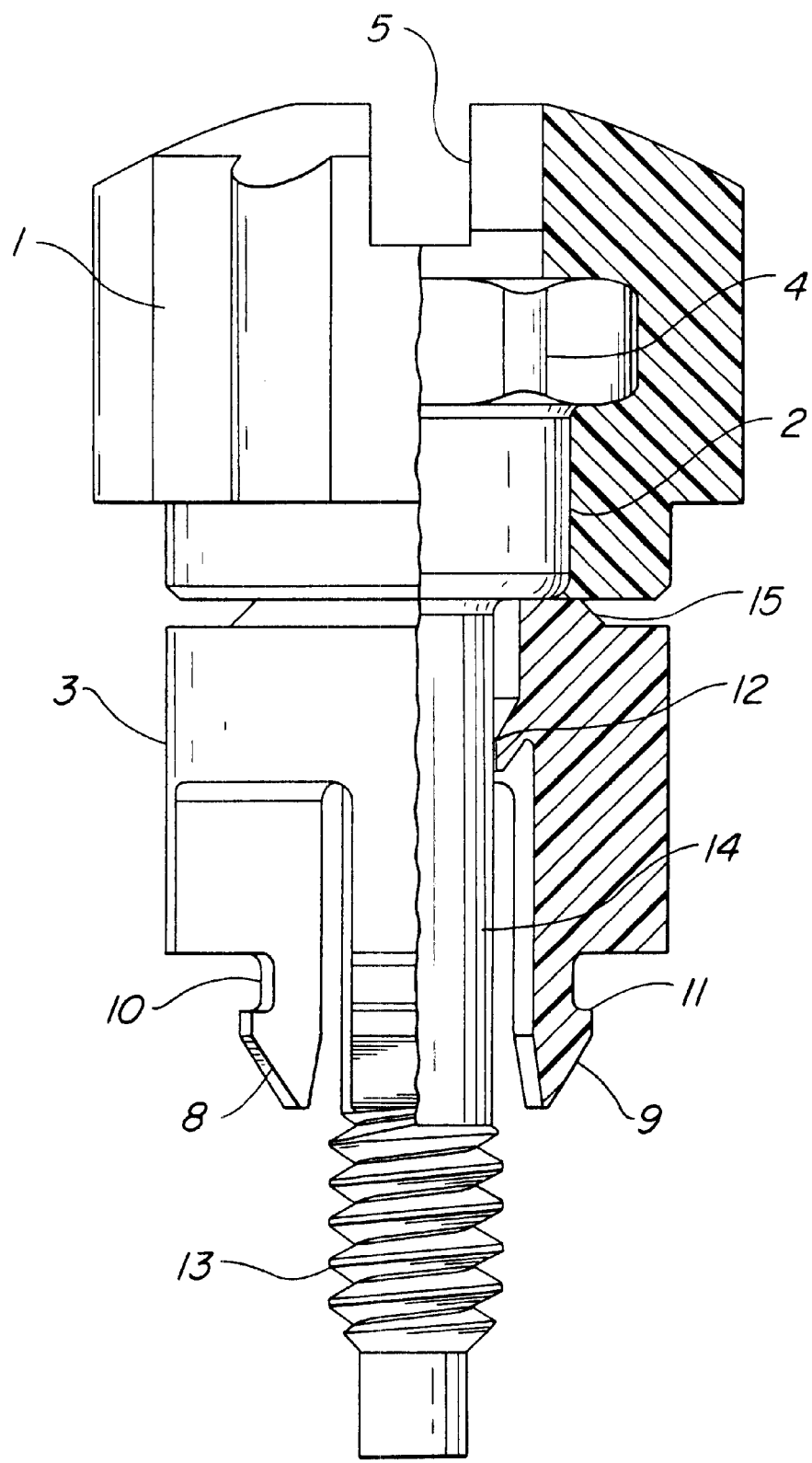
FIG. 3 is a side sectional view of the panel fastener in the extended position.

FIG. 3, is a front isometric view of the present invention in the extended position which shows greater detail of the three components of the invention—the cap 1, the screw 2 and the ferrule 3. Also shown with clarity are resilient fingers 8 with integral lead-in angle 9, ferrule undercut 10 flat surface of finger undercut 11, internal annular ring 12, a tool-driving slot 5 and reduced diameter portion 14 of screw shank. The reduced diameter portion in the preferred embodiment is a annular ring integral with the ferrule which is dimensioned to be less than the major diameter of the screw head and screw thread and equal to its minor diameter. Being of the same material as the ferrule which provides elasticity it expands as the threaded portion of the screw is pushed through it but then contracts to its normal diameter once the threaded portion has passed. Thus, the screw becomes captivated in the ferrule and may be easily assembled. Ease of assembly is further provided by the annular ring having a tapered upper surface and an undercut along the periphery of the underside. If disassembly of this screw from the ferrule is desired, the ferrule is pulled to its extended position and simply unscrewed from the ferrule, the annular ring functioning as a mating female thread with the threads of the screw. The above described shape of the annular ring provides the capability of this feature which is an important aspect of the invention.

Figure 4:
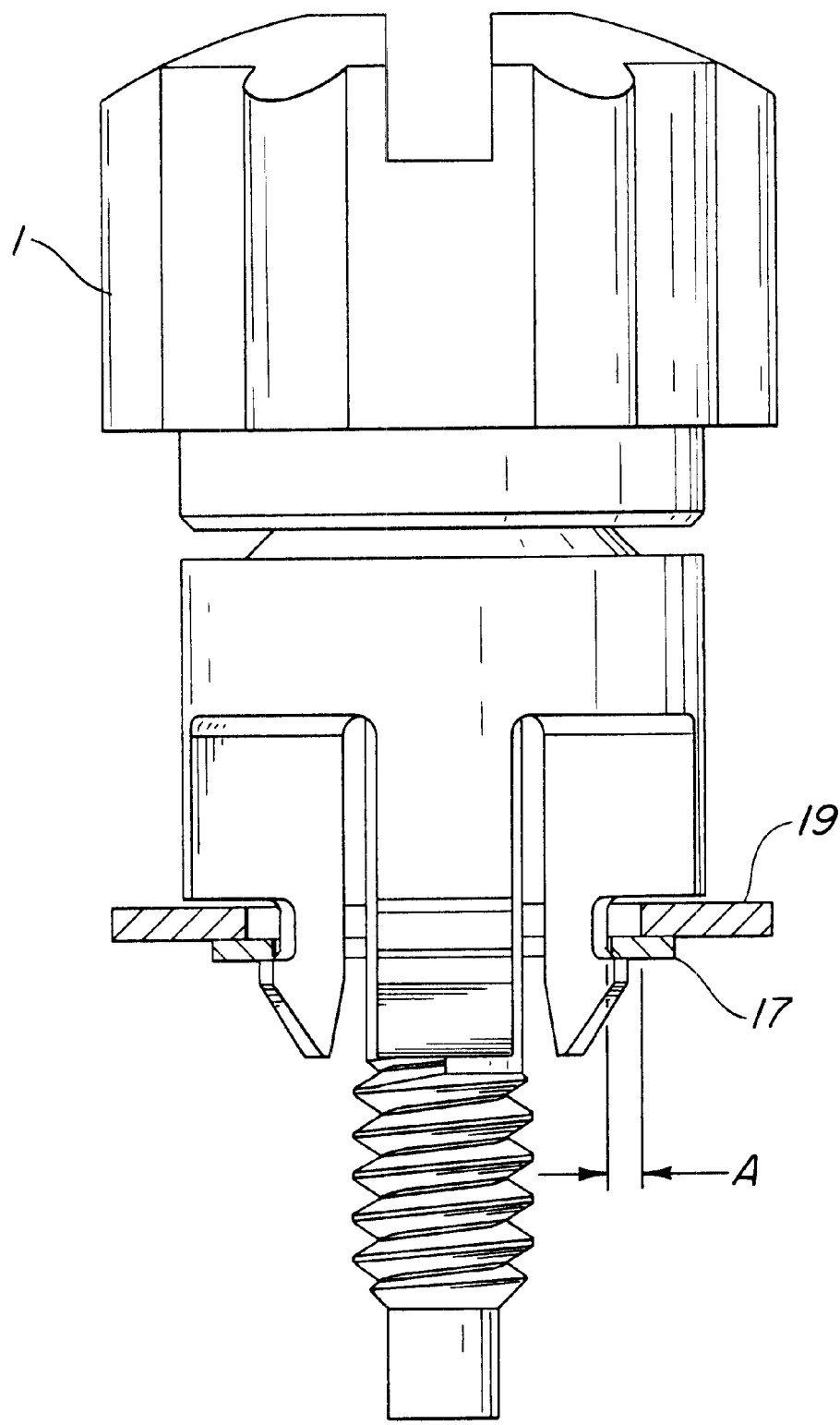
FIG. 4 is a side view of an alternate embodiment of the present invention.

FIG. 4, is an alternate floating design with washer. Ferrule 1 is retained to first panel by snapping a ferrule retainer washer 17 to the ferrule on the bottom side on the first panel 19. This figure also shows the location of the panel 19 securely held within the ferrule undercut, albeit with the aid of washer 17. It will be readily understood that the washerless embodiment shown in FIGS. 1–3 allow for a panel thickness and a hole appropriately sized for the undercut of the ferrule. The embodiment shown in FIG. 4 which includes a washer, allows for significant radial movement while retaining its grip on the panel axially. This embodiment may be useful in applications where accommodation of misalignment between the registration of the panels is required.

The present invention provides many advantages. The length of the snap fingers of the panel fasteners of the prior art is relatively short, in most cases by only the length necessary to project through the panel. This has a disadvantage in that should such a panel fastener become dislodged, the stress on the fingers typically exceeds the elastic limit of the finger material, rendering the part unfit for reuse. The new invention has the advantage of removability without damage to the panel material or the fastener assembly itself. In the present invention, the resilient fingers extend upward more than ½ the length of the ferrule so that significant leverage is developed, keeping flexural stresses well under the elastic limit of the material.

The ferrule body is designed to support compressive loads as the screw is securely tightened in its mating thread. This support is obtained by means of the column strength of the bearing area on the four fingers resting on top of the first panel. The compressive load between the metal screw and plastic ferrule is supported by the raised, annular bearing area on the top surface of the ferrule. This bearing area eliminates possible damage to the plastic knob due to compressive loads or rotational friction and provides a means of uniformly distributing compressive loads in the panel fastener assembly.

The use of plastic materials in both the knob and the ferrule allows for limitless possibilities for colors and contours. This is favorable when custom colors are required to match the color of the panel or to bring attention to the panel fastener assembly. In addition, the outside surfaces of the knob and ferrule can be molded into limitless contours for ergonomics and appearance and may be designed to act as another element, for example, the ferrule may also act as a spring anchor, requiring only a groove molded around the ferrule body, while still retaining all of the features of a panel fastener. Additionally, the use of a plastic material, especially in the cap, provides for "tactile insulation" from heat transferred by the metal screw when the fastener is used in an elevated temperature application.

From the foregoing description of the invention it will be apparent that the objects of the invention have been achieved. Other modifications may be made which will be obvious to one of skill in the art from the description of the preferred embodiment, however the scope of the applicant's invention should be limited only by the following claims and legal equivalence.

What is claimed is:

1. A fastener for attachment to a panel, comprising:
 a screw having a head with a drive recess to facilitate rotation by a tool, an elongate shank, and a threaded portion adjacent one end of said screw opposite said head;
 a hollow ferrule having a bore through which said screw shank slides, said ferrule including panel attachment means at one end to attach said ferrule to a panel, said attachment means comprising a plurality of resilient elongate fingers, each finger including an undercut and an angled head having a lead-in surface;
 an annular ring located within an axial bore of said hollow ferrule, the inside diameter of said ring being greater than the diameter of said shank of said screw, but smaller than the major diameter of said threaded portion, said angular ring and said ferrule being of unitary construction and composed of a resilient moldable material; and
 a raised annular bearing surface extending from a second end of said ferrule opposite said attachment means.

2. The panel fastener of claim 1 wherein said head of said screw includes an overmolded knob.

3. The panel fastener of claim 2 wherein said knob includes upward-facing tool-driving slots around its periphery, said tool-driving slots being centered on the axis of the screw.

4. The panel fastener of claim 2 wherein said ferrule is composed of a molded acetyl copolymer.

5. The panel fastener of claim 2 wherein said knob further includes a plurality of flutes located around its outer circumference to provide an ergonomic finger grip.

6. The panel fastener of claim 1 wherein said fingers are more than one half the length of the-ferrule.

7. The fastener of claim 1 wherein said raised annular bearing surface is of reduced diameter.

8. A fastener for attachment to a panel, comprising:
 a screw having a head with a drive recess to facilitate rotation by a tool, an elongate shank, and a threaded portion adjacent one end of said screw opposite said head;

a hollow ferrule having a bore through which said screw shank slides, said ferrule including panel attachment means at one end to attach said ferrule to a panel, said attachment means comprising a plurality of resilient elongate fingers, each finger including an undercut and an angled head having a lead-in surface;

an annular ring located within an axial bore of said hollow ferrule, the inside diameter of said ring being greater than the diameter of said shank of said screw, but smaller than the major diameter of said threaded portion, said angular ring and said ferrule being of unitary construction and composed of a resilient moldable material; and a knob molded over the head of said screw, said knob including a plurality of upward-facing tool driving slots located around its periphery.

9. The fastener of claim 8 further including a tool drive recess in the center of the head of said screw extending into said screw below a bottom of said slot.

* * * * *

UNITED STATES PATENT AND TRADEMARK OFFICE
CERTIFICATE OF CORRECTION

PATENT NO. : 6,394,724 B1
DATED : May 28, 2002
INVENTOR(S) : Patrick Kelly et al.

It is certified that error appears in the above-identified patent and that said Letters Patent is hereby corrected as shown below:

Title page,
Item [57], ABSTRACT,
Line 3, change "of cold forming process" to -- of a cold forming process --.

Column 1,
Line 67, change "inert" to -- insert --.

Column 2,
Lines 6 and 9, change "inert" to -- insert --.
Line 19, change "cos" to -- cost --.
Line 58, change "elements sectioned: and" to -- elements sectioned; --.
Line 60, change "extended position;" to -- extended position; and --.

Column 3,
Line 3, delete "are" before "shown" and substitute -- is -- therefor.
Line 16, change "ferrule undercut 10" to -- ferrule undercut 10, --.
Line 18, change "diameter portion 14 of screw" to -- diameter portion 14 of the screw --.
Line 20, delete "a" before "annular" and substitute -- an -- therefor.
Line 37, change "with washer" to -- with a washer --.
Line 38, change "retained to first panel" to -- retained to a first panel --.

Column 4,
Line 2, change "of the-ferrule" to -- of the ferrule --.
Line 16, delete "angular" before "ring" and substitute -- annular -- therefor.
Line 27, delete "equivalence" and substitute -- equivalents -- therefor.

UNITED STATES PATENT AND TRADEMARK OFFICE
CERTIFICATE OF CORRECTION

PATENT NO. : 6,394,724 B1
DATED : May 28, 2002
INVENTOR(S) : Patrick Kelly et al.

It is certified that error appears in the above-identified patent and that said Letters Patent is hereby corrected as shown below:

Column 5,
Line 16, delete "angular" before "ring" and substitute -- annular -- therefor.

Signed and Sealed this

Twenty-third Day of July, 2002

*Attest:*

JAMES E. ROGAN
*Director of the United States Patent and Trademark Office*

*Attesting Officer*